United States Patent
Chen et al.

(10) Patent No.: US 10,677,961 B1
(45) Date of Patent: Jun. 9, 2020

(54) METHOD FOR OPTIMIZING PERFORATION PARAMETERS TO MAINTAIN UNIFORM FRACTURE GROWTH IN MULTI-STAGE HYDRAULIC FRACTURING OF HORIZONTAL WELL

(71) Applicant: Southwest Petroleum University, Chengdu (CN)

(72) Inventors: Xiyu Chen, Chengdu (CN); Jinzhou Zhao, Chengdu (CN); Yongming Li, Chengdu (CN); Youshi Jiang, Chengdu (CN); Wenjun Xu, Chengdu (CN); Dongyu Fu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/560,974

(22) Filed: Sep. 4, 2019

(30) Foreign Application Priority Data

Jul. 8, 2019 (CN) .......................... 2019 1 0608226

(51) Int. Cl.
*G01V 99/00* (2009.01)
*E21B 41/00* (2006.01)
(Continued)

(52) U.S. Cl.
CPC ........ *G01V 99/005* (2013.01); *E21B 41/0092* (2013.01); *E21B 43/26* (2013.01);
(Continued)

(58) Field of Classification Search
None
See application file for complete search history.

(56) References Cited

U.S. PATENT DOCUMENTS 9,442,205 B2 * 9/2016 Geiser .................... G01V 1/288
9,618,652 B2 * 4/2017 Weng ...................... E21B 43/26
(Continued)

OTHER PUBLICATIONS

Izadi, Ghazal, Randy Settgast, Daniel Moos, Christine Baba, and Hyunil Jo. "Fully 3D Hydraulic Fracture Growth within Multi-stage Horizontal Wells." In 13th ISRM International Congress of Rock Mechanics. International Society for Rock Mechanics and Rock Engineering. (Year: 2015).*

(Continued)

*Primary Examiner* — Aniss Chad
(74) *Attorney, Agent, or Firm* — Ding Yu Tan (57) ABSTRACT

A method for optimizing perforation parameters to maintain uniform fracture growth in multi-stage hydraulic fracturing of horizontal well and device therefor are provided. The method includes steps of: S1: collecting the geological and engineering parameters of the targeted pay zone, and estimating the net inlet pressure of fractures within the targeted fracturing stage of horizontal well; S2: calculating the perforation friction coefficient required for maintaining the uniform fracture growth in multi-stage hydraulic fracturing of horizontal well; S3: calculating the perforation characteristic parameter; and S4: determining the optimized perforation parameters. The method considers the stress heterogeneity, the stress shadowing and the perforation erosion in the process of dynamic hydraulic fracturing propagation, and also the influence of perforation erosion. The invention can effectively maintain uniform fracture growth in multi-stage hydraulic fracturing of horizontal well, which can easily operate and is practical.

7 Claims, 7 Drawing Sheets

(51) Int. Cl.
 *E21B 49/00* (2006.01)
 *E21B 43/26* (2006.01)
 *G06F 30/20* (2020.01)
 *G06F 111/10* (2020.01)

(52) U.S. Cl.
 CPC .............. *E21B 49/00* (2013.01); *G06F 30/20* (2020.01); *G06F 2111/10* (2020.01)

(56) References Cited

U.S. PATENT DOCUMENTS

| | | | |
|---|---|---|---|
| 10,422,208 B2* | 9/2019 | Weng | E21B 43/26 |
| 10,544,667 B2* | 1/2020 | Wu | E21B 47/00 |
| 2019/0112909 A1* | 4/2019 | Zeng | E21B 43/26 |
| 2019/0292884 A1* | 9/2019 | McClure | G06F 3/04815 |

OTHER PUBLICATIONS

"Numerical Simulation of multi-stage fracturing and optimization of perforation in a horizontal well" Zhao, Jinzhou et al. Petroleum Exploration and Development, vol. 44, No. 1, pp. 117-122, publication date: Feb. 28, 2017.

* cited by examiner

METHOD FOR OPTIMIZING PERFORATION PARAMETERS TO MAINTAIN UNIFORM FRACTURE GROWTH IN MULTI-STAGE HYDRAULIC FRACTURING OF HORIZONTAL WELL

FIELD OF INVENTION

The present invention relates to the technical field of oil and gas field development, in particular, to a method for optimizing perforation parameters to maintain uniform fracture growth in multi-stage hydraulic fracturing of horizontal well and device therefor.

BACKGROUND OF THE INVENTION

At present, multi-stage hydraulic fracturing of horizontal well is one of the most effective technical means for developing unconventional low-permeability reservoirs. By densely placing perforation clusters in the fracturing stage, the engineers hope that this technology can form closely distributed and uniform hydraulic fractures within the pay zone to significantly increase the permeability and hydrocarbon productions. However, in recent years, the engineers have realized from the monitoring data that there is often a serious non-uniformity of fracture growth extents in the hydraulic fracturing. During the multi-stage hydraulic fracturing process, most of fracturing fluids only flow into few of hydraulic fractures, hence that most of hydraulic fractures cannot obtain enough fracturing fluids. As a result, a large proportion of hydraulic fractures gradually slows down or even stops their growths with time. The non-uniformity of fracture growth extents damages the performance of fracturing stimulations, at least in two different aspects. First, the hydraulic fractures are not evenly developed, therefore the reservoir is not completely stimulated, which causes a serious waste of construction costs. Second, a small portion of hydraulic fractures acquire too much fracturing fluids and their growth extents are out-of-control. These oversize hydraulic fractures may touch with the neighboring wells to generate a serious inter-well interference, which leads to a reduction of production in neighboring wells. Therefore, whether or not the uniform fracture growth can be maintained is a key factor affecting the performance of multi-stage hydraulic fracturing in horizontal wells. In the past 20 years, a large number of engineers and researchers have studied the physical mechanism for the occurrence of non-uniform fracture growth. These research results show that two factors, namely, the rock physical heterogeneity and stress shadowing, play important roles in the occurrence of non-uniform fracture growth.

In order to maintain the uniform fracture growth in multi-stage hydraulic fracturing of horizontal well, some researchers have proposed several treatments, e.g., the limited-entry method, cluster spacing optimization and fluid diversion, to control the differences between fracture growth extents. Among them, the limited-entry method is relatively simpler in operation and lower in cost, and thus has been widely used in the field. The core theory of this technology is that the perforation friction at fracture inlet can be increased by adjusting the design of the perforation parameters to balance the fluid resistances through each fracture, thereby maintaining the balance of the fluid supply and fracture growth extents. Field practice has shown that the limited-entry method has obvious improvement effects on the uniformity of fracture growth extents, but its performance relies heavily on the reasonable design of the perforation parameters. The effectiveness of limited-entry method with poor design of perforation parameters will be gradually lost during the fracturing process, partly due to the perforation erosion. Mistakes in the design of perforation parameters may even exacerbate the uniformity of fracture growth extents. At present, due to the lack of scientific methods for optimizing the design of perforation parameters, many engineers have implemented design based on their own engineering experiences, resulting in unstable performances of limited-entry method on site. Thus, there exists a need to provide a method for optimizing perforation parameters to maintain uniform fracture growth in multi-stage hydraulic fracturing of horizontal well.

It should be noted that the above description of the technical background is merely for the purpose of facilitating a clear and complete description of technical solutions of the present invention, and is convenient for understanding by those skilled in the art. The above technical solutions should not be considered to be well-known to those skilled in the art, simply because these aspects are set forth in background segment of the present invention.

SUMMARY OF THE INVENTION

For above problems, a method for optimizing perforation parameters is provided in the present invention in order to maintain uniform fracture growth in multi-stage hydraulic fracturing of horizontal well.

According to an exemplary embodiment, a method for optimizing perforation parameters to maintain uniform fracture growth in multi-stage hydraulic fracturing of horizontal well is provided. The method includes the following steps: S1: collecting the geological and engineering parameters of the targeted pay zone, and estimating the net inlet pressure of fractures within the targeted fracturing stage of horizontal well; S2: calculating the perforation friction coefficient required for maintaining the uniform fracture growth in multi-stage hydraulic fracturing of horizontal well; S3: calculating the perforation characteristic parameter; and S4: determining the optimized perforation parameters.

In one embodiment, the net inlet pressure of fractures within the targeted fracturing stage of horizontal well is calculated according to formula (1):

$$p_i = 1.28 \times \left[ \frac{E^4 (Q/N)^2 \mu}{(1-v^2)^4 h^6} \right]^{0.2} t^{0.2}; \tag{1}$$

wherein:
$p_i$ is the net inlet pressure of fractures within the fracturing stage, MPa;
E is the Young's modulus of the reservoir rock, MPa;
Q is the total pumping flow rate of fracturing fluid, m³/s;
N is the number of perforation clusters in the fracturing stage, no factor;
μ is the viscosity of the fracturing fluid, MPa·s;
v is the Poisson's ratio of the reservoir rock, no factor;
h is the thickness of the reservoir rock, m;
t is the pumping time, s.

In one embodiment, the step S2 further comprises the following sub-steps:
S21: calculating the minimum horizontal principal stress difference in the fracturing stage:

$$\sigma_d = \sigma_{max} - \sigma_{min} \tag{2};$$

wherein:

$\sigma_d$ is the minimum horizontal principal stress difference in the fracturing stage, MPa;

$\sigma_{max}$ is the maximum value among the minimum horizontal principal stresses at every perforation clusters in the fracturing stage, MPa;

$\sigma_{min}$ is the minimum value among the minimum horizontal principal stresses at every perforation clusters in the fracturing stage, MPa;

S22: calculating the equivalent value of stress shadowing:

$$S = Gp_i + \sigma_d \qquad (3);$$

$$G = 1 - \frac{d^3}{[d^2 + (h/2)^2]^{3/2}}; \qquad (4)$$

wherein:

S is the equivalent value of stress shadowing, MPa;
G is the attenuation coefficient related to the distance, no factor;
$p_i$ is the net inlet pressure of fractures within the fracturing stage, MPa;
d is the spacing between the perforation clusters, m;
h is the thickness of the reservoir rock, m;

S23: calculating the perforation friction coefficient required for maintaining the uniform fracture growth in fracturing stage:

$$\alpha_f = \frac{\lambda S}{(Q/N)^2}; \qquad (5)$$

wherein:

$\alpha_f$ is the required perforation friction coefficient, MPa·s$^2$/m$^6$;
$\lambda$ is a constant coefficient, no factor;
Q is the total pumping flow rate of fracturing fluid, m$^3$/s;
N is the number of perforation clusters in the fracturing stage, no factor.

In one embodiment, the constant coefficient $\lambda=1+0.2x$, x is the number of repeats of step S2, and x is initially set as 0.

In one embodiment, the perforation characteristic parameter is calculated according to formula (6):

$$F = \left(\frac{8 \times 10^{-6} \rho}{\pi^2 K^2 \alpha_f}\right)^{0.5}; \qquad (6)$$

wherein:

F is the perforation characteristic parameter, m$^2$;
$\rho$ is the density of the fracturing fluid, kg/m$^3$;
K is the discharge coefficient, no factor;
$\alpha_f$ is the required perforation friction coefficient, MPa·s$^2$/m$^6$.

In one embodiment, the discharge coefficient K=0.6.

In one embodiment, in the step S4, several of candidates of perforating guns are firstly selected according to the perforation characteristic parameter F calculated in the step S3 and formula (7), with reference to a list index of perforation parameters for commonly-used perforating guns. Then, the most suitable perforating gun, which $n_p d_p^2$ is closest to the parameter F and size is suitable for the sleeve, is further chose, and accordingly the optimized perforation density $d_d$ and perforation diameter $d_p$ are determined. The candidates of perforating gun should satisfy:

$$n_p d_p^2 \leq F \qquad (7);$$

$$n_p = l_p d_d \qquad (8);$$

wherein:

$n_p$ is the number of perforation in the perforation cluster, no factor;
$d_p$ is the perforation diameter, m;
F is the perforation characteristic parameter, m$^2$;
$L_p$ is the designed length of perforation interval, m;
$d_d$ is the perforation density of the perforation clusters, 1/m.

In one embodiment, the method further includes steps of: S5: establishing a fully coupled numerical model for hydraulic fracture growth; and S6: predicting and evaluating the uniformity of fracture growth extents in multi-stage hydraulic fracturing using the optimized perforation parameters.

In one embodiment, the step S5 further comprises the following sub-steps:

S51: dividing the fracturing time into multiple time steps, calculating the fluid-solid coupling equation in each time step to obtain the fracture width w and the net fluid pressure p:

$$w = \Delta t [B(w,d)_p] + \Delta t (Q_{V,n}/h) \delta + w_{t-1} \qquad (9);$$

wherein:

w is the fracture width, m;
$\Delta t$ is the time step, s;
B(w, d) is the fluid-solid coupling coefficient matrix, m·MPa$^{-1}$;
d is the spacing between the perforation clusters, m;
p is the net fluid pressure, MPa;
$Q_{V,n}$ is the pumping flow rate of n-th fracture, m$^3$/s;
h is the thickness of the reservoir rock, m;
$\delta$ is the Dirac $\delta$ function, representing the pump source, m$^{-1}$;
$w_{t-1}$ is the fracture width at the previous time step, m;

Boundary conditions required to calculate formula (9) are:

$$\begin{cases} p_o^1 + p_p^1 = p_o^2 + p_p^2 = \ldots = p_o^N + p_p^N \\ Q = \sum_{n=1}^{N} Q_{V,n} \\ p_p^n = \frac{8 \times 10^{-6} \rho Q_{V,n}^2}{\pi^2 n_p^2 d_p^4 K^2} \end{cases} \qquad (10)$$

wherein:

$p_o$ is the fluid pressure at inlet of the n-th fracture, MPa;
$p_p$ is the perforation frictional pressure drop of the n-th fracture, MPa;
Q is the total pumping flow rate of fracturing fluid, m$^3$/s;
$\rho$ is the density of the fracturing fluid, kg/m$^3$;
$n_p$ is the number of perforation in the perforation cluster, no factor;
$d_p$ is the perforation diameter, m;
K is the discharge coefficient, no factor;

S52: after obtaining the fracture width w and the net fluid pressure p, calculating the growth direction of the hydraulic fracture in the time step;

$$\tan(\theta/2) = -\frac{2\tau}{1 + \sqrt{1 + 8\tau^2}}; \qquad (11)$$

wherein:

θ is the deflection angle of the fracture growth path, no factor;

τ is the ratio of the type II stress intensity factor of the hydraulic fracture to the type I stress intensity factor of the hydraulic fracture, no factor;

The fully coupled numerical model for hydraulic fracture growth is composed of the formulas (9), (10) and (11).

In one embodiment, the step S6 further comprises the following sub-steps:

S61: substituting the geological and engineering parameters of the target pay zone into the fully coupled numerical model established in the step S5, selecting the optimized perforation parameters that are the perforation density $d_d$ and the perforation diameter $d_p$ for simulation calculation, and predicting the fracture growth results in multi-stage hydraulic fracturing;

S62: calculating the coefficient of variation for the lengths of all fractures in the fracturing stage after multi-stage hydraulic fracturing, according to the simulation results:

$$C = \frac{\sigma_l}{\left(\sum_{n}^{N} l_n\right)/N}; \quad (12)$$

wherein:

C is the coefficient of variation for the lengths of all fractures in the fracturing stage, no factor;

$\sigma_l$ is the standard deviation for the lengths of all fractures in the fracturing stage, m;

$l_n$ is the fracture length of n-th fracture, m;

N is the number of perforation clusters in the fracturing stage, no factor;

S63: determining whether the optimized perforation parameters can effectively maintain the uniform growth of hydraulic fractures according to the calculation results of the coefficient of variation C:

when C obtained by calculation is <0.25, it is considered that the optimized perforation parameters can effectively maintain the uniform growth of hydraulic fractures;

when C obtained by calculation is ≥0.25, it is considered that the optimized perforation parameters cannot effectively maintain the uniform growth of hydraulic fractures, then repeating steps S2 to S6 to further optimize the perforation parameters.

According to another exemplary embodiment, a device for optimizing perforation parameters to maintain the uniform fracture growth in multi-stage hydraulic fracturing of horizontal well is provided. The device includes a collection and estimation module, a perforation friction coefficient calculation module, a perforation characteristic parameter calculation module, a determination module, a model establishing module, and a prediction and evaluation module. The collection and estimation module is configured to collect geological and engineering parameters of a target pay zone, and estimate the net inlet pressure of fractures within the targeted fracturing stage of horizontal well. The perforation friction coefficient calculation module is configured to calculate the perforation friction coefficient required for maintaining the uniform fracture growth in multi-stage hydraulic fracturing of horizontal well. The perforation characteristic parameter calculation module is configured to calculate the perforation characteristic parameter. The determination module is configured to determine the optimized perforation parameters. The model establishing module is configured to establish a fully coupled numerical model for hydraulic fracture growth. The prediction and evaluation module is configured to predict and evaluate the uniformity of fracture growth extents in multi-stage hydraulic fracturing using the optimized perforation parameters.

Compared with the prior art, the present invention has the following advantages:

1. The method for design optimization comprehensively considers the stress heterogeneity, the stress shadowing and the perforation erosion, so as to overcome the one-sidedness of the existing design optimization method.

2. Selecting the optimized perforating gun mainly according to the perforation characteristic parameter F. The optimized design will not bring unnecessary burden on the ground facilities and hindrance of fluid flow, by selecting perforation parameters with proper $n_p d_p^2$ value. The optimized perforation density $d_d$ and perforation diameter $d_p$ can meet the practical demand in engineering.

3. In order to have objectivity, accuracy and practicality, a fully coupled numerical model is adopted in the invention for predicting and quantitatively evaluating the fracture growth results with the optimized perforation parameters. This makes up for the shortcomings of the existing methods on the design evaluating.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE PREFERRED EMBODIMENTS

The following invention provides different embodiment, or examples, for implementing different features of the provided subject matter. Specific examples of components and arrangements are described below to simplify the present invention. These are, of course, merely examples and are not intended to be limiting. For example, the formation of a first feature over or on a second feature in the description that follows may include embodiment in which the first and second features are formed in direct contact, and may also include embodiment in which additional features may be formed between the first and second features, such that the first and second features may not be in direct contact. In addition, the present invention may repeat reference numerals and/or letters in the various examples. This repetition is for the purpose of simplicity and clarity and does not in itself dictate a relationship between the various embodiment and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiment 1

As shown in FIGS. 1-4, taking the 7th fracturing stage of the shale gas well XS in the southern part of Sichuan as an example, the 7th fracturing stage has three clusters of perforations. A method for optimizing perforation parameters to maintain the uniform fracture growth in multi-stage hydraulic fracturing of horizontal well includes the following steps:

S1: Collecting and arranging the geological and engineering parameters of the 7th fracturing stage of the shale gas well XS, shown in Table 1:

TABLE 1

| Example - Geological and engineering parameter table for 7th fracturing stage of the shale gas well XS | | | |
|---|---|---|---|
| Young's modulus E, MPa | 21000 | Pumping time $t_s$, s | 2400 |
| Maximum horizontal minimum principal stress $\sigma_{max}$, MPa | 47.2 | Minimum horizontal maximum principal stress $\sigma_{min}$, MPa | 46.1 |
| Poisson's ratio ν | 0.18 | Cluster spacing d, m | 15 |
| Fracturing fluid viscosity μ, MPa · s | 1 × 10$^{-8}$ | Reservoir thickness h, m | 25 |
| Fracturing fluid total pumping flow Q, m³/s | 0.083 | Fracturing fluid density ρ, kg/m³ | 1000 |
| Sleeve outer diameter, mm | 114.3 | Sleeve inner diameter, mm | 100 |

The net inlet pressure of fractures within the fracturing stage of horizontal well is calculated based on formula (1): $p_i$=2.25 MPa.

S2: According to the well logging data, calculating the minimum principal stress difference $\sigma_d$ in the fracture stage based on the formula (2) as 1.1 MPa, and calculating the attenuation coefficient G based on the formula (4) as 0.5466. Then, calculating the equivalent value of stress shadowing S as 2.33 MPa based on the formula (3). Finally, taking the constant coefficient λ to be 1, and calculating the required perforation friction coefficient $\alpha_f$ based on the formula (5) as 3043.98 MPa·s²/m⁶.

S3: Taking K to be 0.6 to consider the perforation erosion effect. Based on the calculated perforation friction coefficient $\alpha_f$ and the formula (6), calculating the perforation characteristic parameter F as 8.6×10$^{-4}$ m².

S4: The designed length of perforation interval $l_p$ is 1 m in the 7th fracturing stage of the shale gas well XS. According to the perforation characteristic parameter F=8.6×10$^{-4}$ m² and the list index of perforation parameters (Table 2), selecting several of candidates of perforating guns that satisfy formula (7) as follows: 1) the perforating gun having an outer diameter of 51 mm, a perforation density $d_d$ of 16 holes per meter, and a perforation diameter $d_p$ of 7.2 mm; 2) the perforating gun having an outer diameter of 60 mm, a perforation density $d_d$ of 12 holes per meter, and a perforation diameter $d_d$ of 7.2 mm. The values of $n_p d_p^2$ corresponding to the above perforating guns are 8.29×10$^{-4}$ m², 6.22×10$^{-4}$ m², respectively, which are smaller than the perforation characteristic parameter F=8.6×10$^{-4}$ m², thereby satisfying the requirement. As the value of $n_p d_p^2$ of the first candidate is closer to the F and its size is suitable for the sleeve, the optimized perforating gun and corresponding perforation parameters are then determined as follows: the first candidate with outer diameter of 51 mm is chosen, the optimized perforation density $d_d$ is 16 holes per meter, and the optimized perforation hole diameter $d_p$ is 7.2 mm.

TABLE 2

| list index of perforation parameters for commonly-used perforating guns | | | | | | | | | | |
|---|---|---|---|---|---|---|---|---|---|---|
| No. | | | | | | | | | | |
| | 1 | 2 | 3 | 4 | 5 | 6 | 7 | 8 | 9 | 10 |
| Outer diameter (mm) | 51 | 60 | 73 | 89 | 89 | 89 | 89 | 89 | 102 | 102 |
| Perforation density $d_d$ (1/m) | 16 | 12 | 16 | 13 | 16 | 20 | 13 | 16 | 32 | 16 |
| Perforation diameter $d_p$ (mm) | 7.2 | 7.2 | 8.5 | 8.8 | 8.8 | 8.8 | 10 | 10 | 8.2 | 8.8 |
| No. | 11 | 12 | 13 | 14 | 15 | 16 | 17 | 18 | 19 | — |
| Outer diameter (mm) | 102 | 102 | 127 | 127 | 127 | 127 | 140 | 159 | 178 | — |
| Perforation density $d_d$ (1/m) | 20 | 16 | 40 | 16 | 20 | 16 | 32 | 40 | 40 | — |
| Perforation diameter $d_p$ (mm) | 8.8 | 10.5 | 10.9 | 11.7 | 11.7 | 12.3 | 11 | 11.6 | 12 | — |

Figure 1:
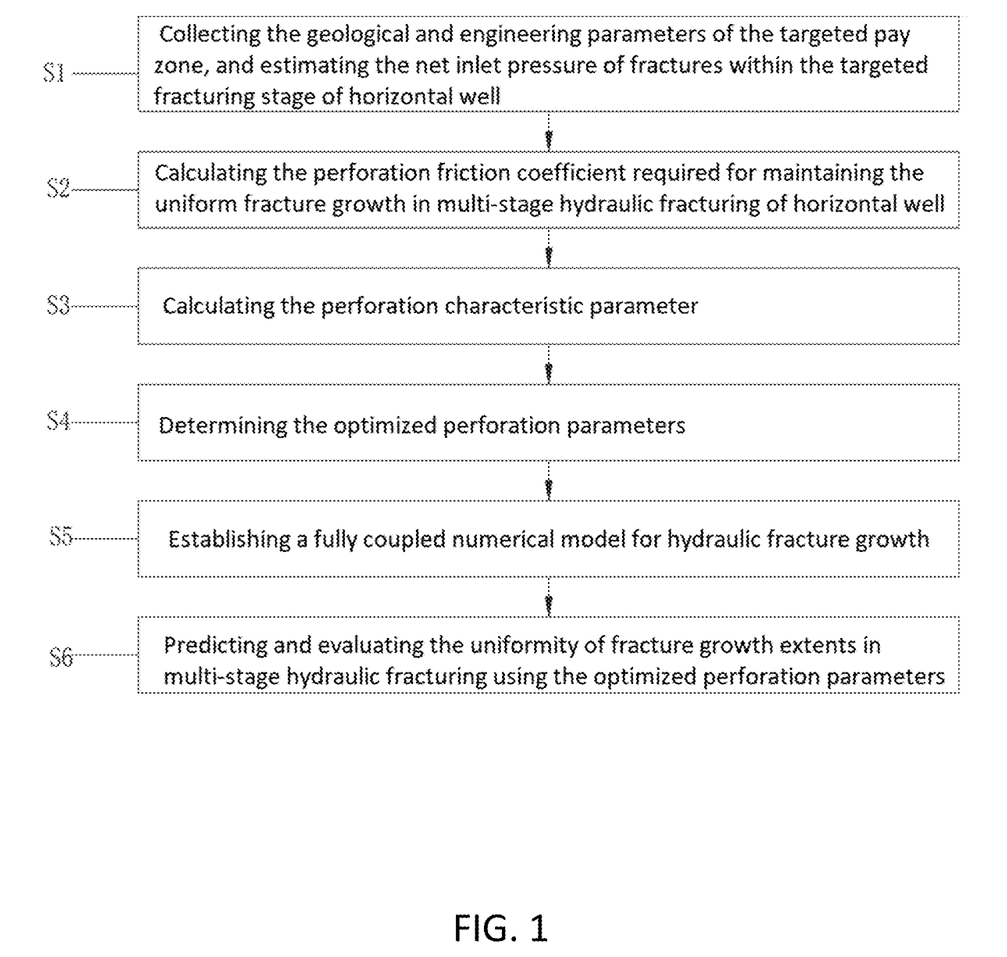
FIG. 1 is a flowchart of a method for optimizing perforation parameters to maintain uniform fracture growth in multi-stage hydraulic fracturing of horizontal well according to an embodiment of the present invention.
Figure 2:
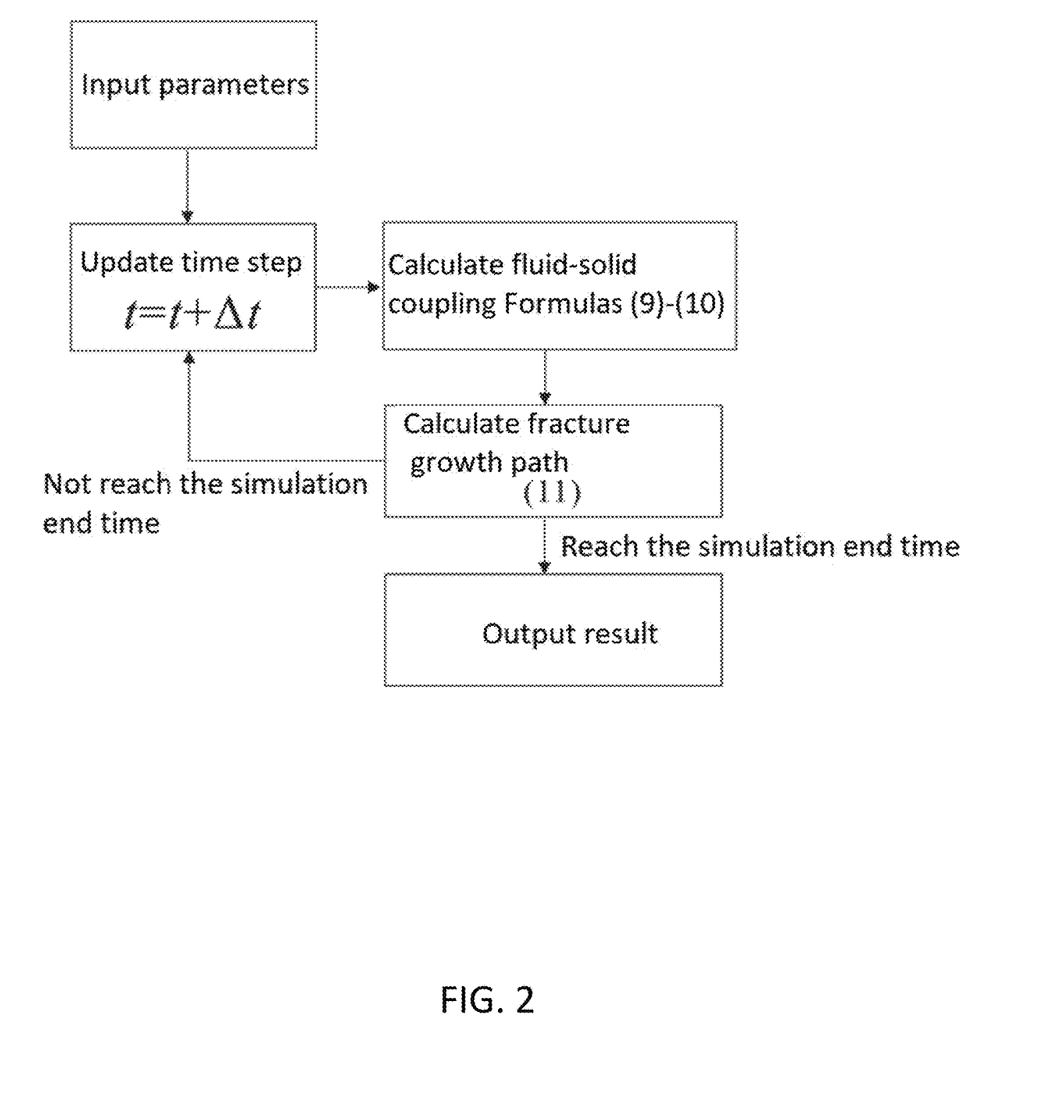
FIG. 2 is a calculation flowchart of a fully coupled numerical model for hydraulic fracture growth in step S5 according to an embodiment of the present invention.
Figure 3:
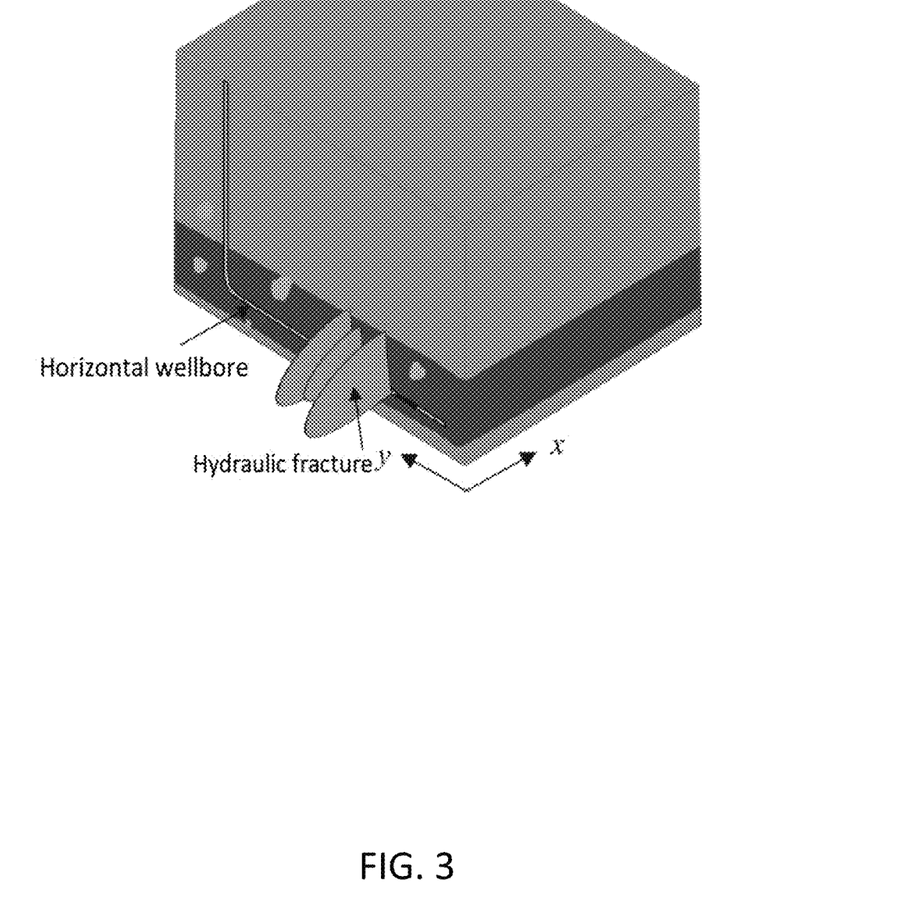
FIG. 3 is a diagram showing a physical model of the 7th fracturing stage of the shale gas well XS according to an embodiment of the present invention.
Figure 4:
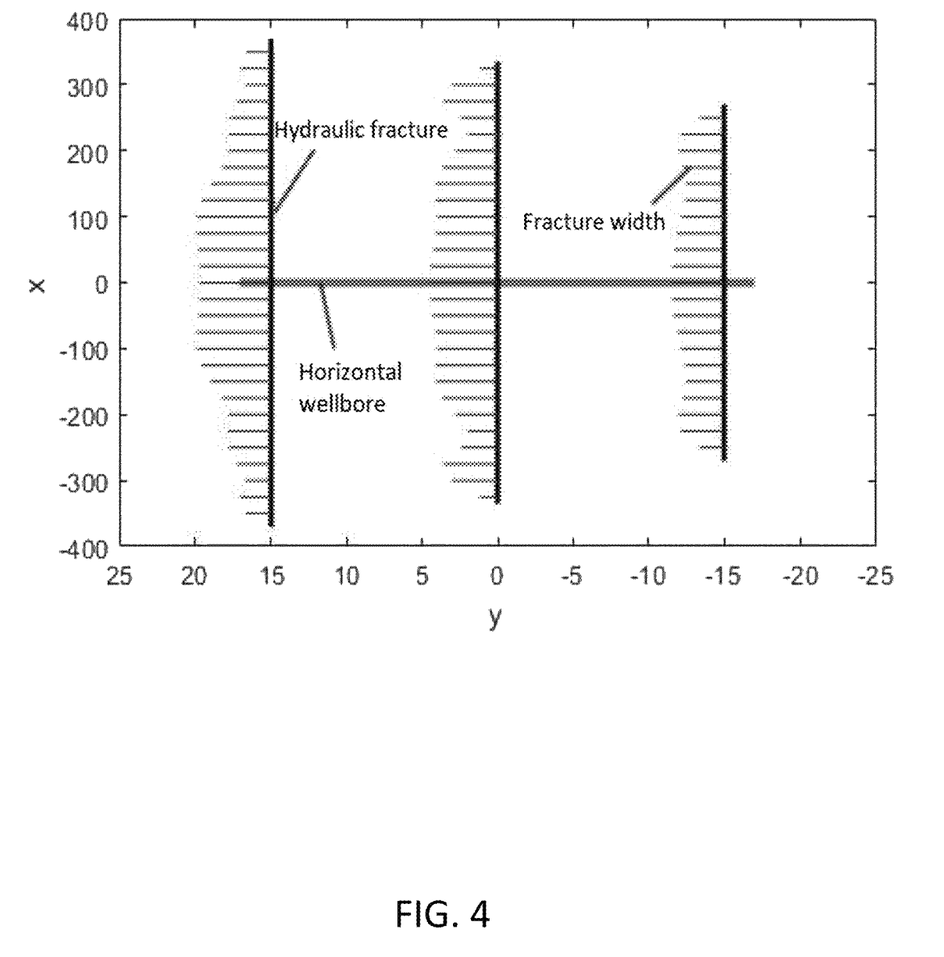
FIG. 4 is a diagram showing the fracture growth results of the simulation in the embodiment of FIG. 3 using the optimized perforation parameters, wherein the fracture width is 800 times enlarged.

S5: Establishing a fully coupled numerical model for hydraulic fracture growth shown in FIG. 3, according to the geological and engineering parameters for the 7th fracturing stage of the shale gas well XS (Table. 1). Then, solving the simulation according to the calculation flow of the numerical model shown in FIG. 2. Among which, the perforation parameters are set as the optimized values that perforation density $d_d=16$ m$^{-1}$ and perforation diameter $d_p=7.2$ mm. The predicted fracture growth results for the pumping time of 2400 s are shown in FIG. 4.

S6: For the simulation results shown in FIG. 4, calculating the variation coefficient C of the fracture lengths as 0.1527 based on the formula (12). The value of C is less than 0.25, indicating the optimized perforation parameters can effectively maintain the uniform growth of hydraulic fractures. After performing actual fracturing treatment in the 7th fracturing stage of the shale gas well XS with the optimized perforation parameters, micro-seismic data are collected for estimating the lengths of hydraulic fracture. The variation of coefficient for fracture lengths is estimated by micro-seismic data as 0.18. Therefore, the design optimization for perforation parameters is effective and the limited-entry method is considered to be successful in this treatment.

Embodiment 2

Figure 5:
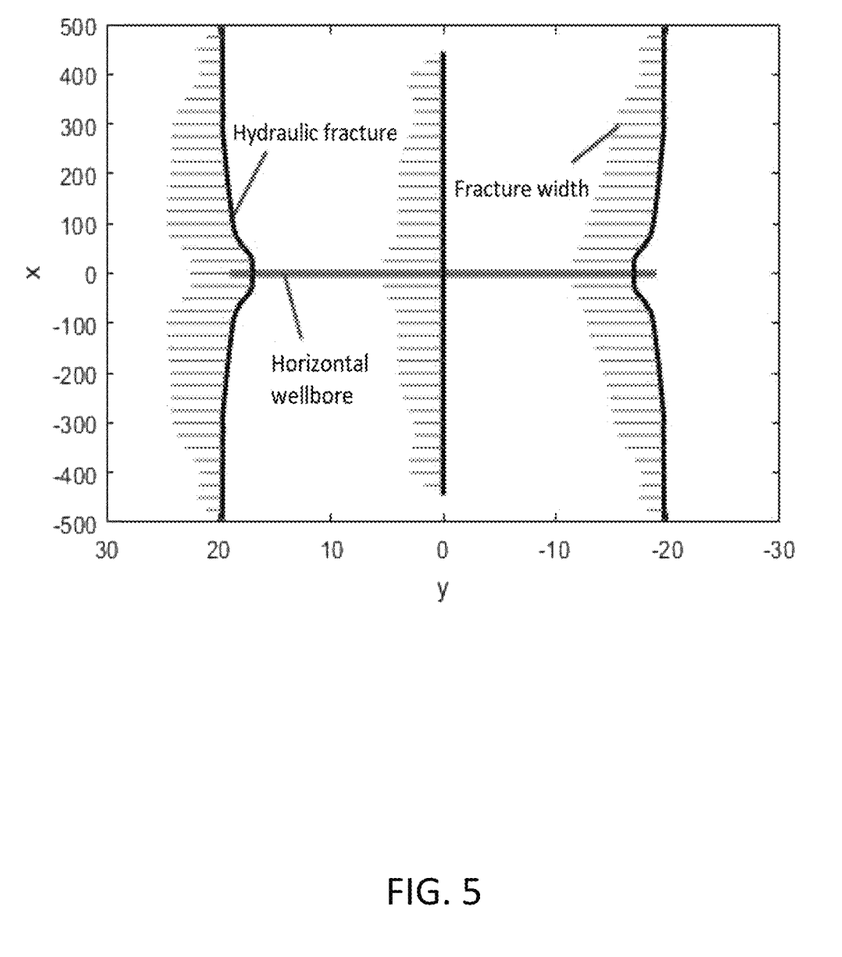
FIG. 5 is a diagram showing the fracture growth results of the simulation of the 1st fracturing stage of the tight oil well CP using the optimized perforation parameters according to another embodiment of the present invention, wherein the fracture width is 800 times enlarged.

As shown in FIG. 5, taking the 1st fracturing stage of the tight oil well CP in the Northeastern region as an example, the 1st fracturing stage has three clusters of perforations. A method for optimizing perforation parameters to maintain uniform fracture growth in multi-stage hydraulic fracturing of horizontal well includes the following steps:

S1: Collecting and arranging the geological and engineering parameters of the 1st fracturing stage of the tight oil well CP, shown in Table 3:

TABLE 3

Example - Geological and engineering parameter table for 1st fracturing stage of the tight oil well CP

| Young's modulus E, MPa | 3800 | Pumping time $t_s$, s | 3000 |
|---|---|---|---|
| Maximum horizontal minimum principal stress $\sigma_{max}$, MPa | 35 | Minimum horizontal maximum principal stress $\sigma_{min}$, MPa | 35 |
| Poisson's ratio ν | 0.22 | Cluster spacing d, m | 14 |
| Fracturing fluid viscosity μ, MPa·s | 1 × 10$^{-8}$ | Reservoir thickness h, m | 20 |
| Fracturing fluid total pumping flow Q, m$^3$/s | 0.133 | Fracturing fluid density ρ, kg/m$^3$ | 1000 |
| Sleeve outer diameter, mm | 127 | Sleeve inner diameter, mm | 108 | fracturing stage The net inlet pressure of fractures within the fracturing stage of horizontal well is calculated based on formula (1): $p_i=6.04$ MPa.

S2: The well logging data showing that the stresses around 1st fracturing stage of the well has a good homogeneity. Calculating a minimum principal stress difference $\sigma_d$ in the fracturing stage based on the formula (2) as 0 MPa, and calculating the attenuation coefficient G according to the formula (4) as 0.4612. Calculating the equivalent value of stress shadowing S of the 1st fracturing stage as 2.7856 MPa based on the formula (3). Finally, taking the constant coefficient λ to be 1, and calculating the required perforation friction coefficient $\alpha_f$ of the 1st fracturing stage based on the formula (5) as 1417.3 MPa·s$^2$/m$^6$.

S3: Taking K to be 0.6 to consider the perforation erosion effect. Based on the calculated perforation friction coefficient of and the formula (6), calculating the perforation characteristic parameter F as $1.26 \times 10^{-3}$ m$^2$.

S4: The designed length of perforation interval $l_p$ is 1 m in the 1st fracturing stage. According to the perforation characteristic parameter F=$1.26 \times 10^{-3}$ m$^2$ and the list index of perforation parameters (Table 2), selecting several of candidates of perforating guns that satisfy formula (7) as Nos. 1-5 and 10. The values of $n_p d_p^2$ corresponding to the above perforating guns are $8.29 \times 10^{-4}$ m$^2$, $6.22 \times 10^{-4}$ m$^2$, $1.16 \times 10^{-3}$ m$^2$, $1.01 \times 10^{-3}$ m$^2$, $1.24 \times 10^{-3}$ m$^2$, $1.24 \times 10^{-3}$ m$^2$, respectively, which are smaller than the perforation characteristic parameter F=$1.26 \times 10^{-3}$ m$^2$, thereby satisfying the requirement. As the value of $n_p d_p^2$ of the fifth candidate is closer to the F and its size is suitable for the sleeve, the optimized perforating gun and corresponding perforation parameters are then determined as follows: the fifth candidate with outer diameter of 89 mm is chosen, the optimized perforation density $d_d$ is 16 holes per meter, and the optimized perforation hole diameter $d_p$ is 8.8 mm.

S5: Establishing a fully coupled numerical model for hydraulic fracture growth shown in FIG. 3, according to the geological and engineering parameters for the 1st fracturing stage of the tight oil well CP. Then, solving the simulation according to the calculation flow of the numerical model shown in FIG. 2. Among which, the perforation parameters are set as the optimized values that perforation density $d_d=16$ m$^{-1}$ and perforation diameter $d_p=8.8$ mm. The predicted fracture growth results for the pumping time of 3000 s are shown in FIG. 5.

S6: For the simulation results shown in FIG. 5, calculating the variation coefficient C of the fracture lengths as 0.0577 based on the formula (12). The value of C is less than 0.25, indicating the optimized perforation parameters can effectively maintain the uniform growth of hydraulic fractures. After performing actual fracturing treatment in the 1st fracturing stage of the tight oil well CP with the optimized perforation parameters, micro-seismic data are collected for estimating the lengths of hydraulic fracture. The variation of coefficient for fracture lengths is estimated by micro-seismic data as 0.071. Therefore, the design optimization for perforation parameters is effective and the limited-entry method is considered to be successful in this treatment.

Embodiment 3

Figure 6:
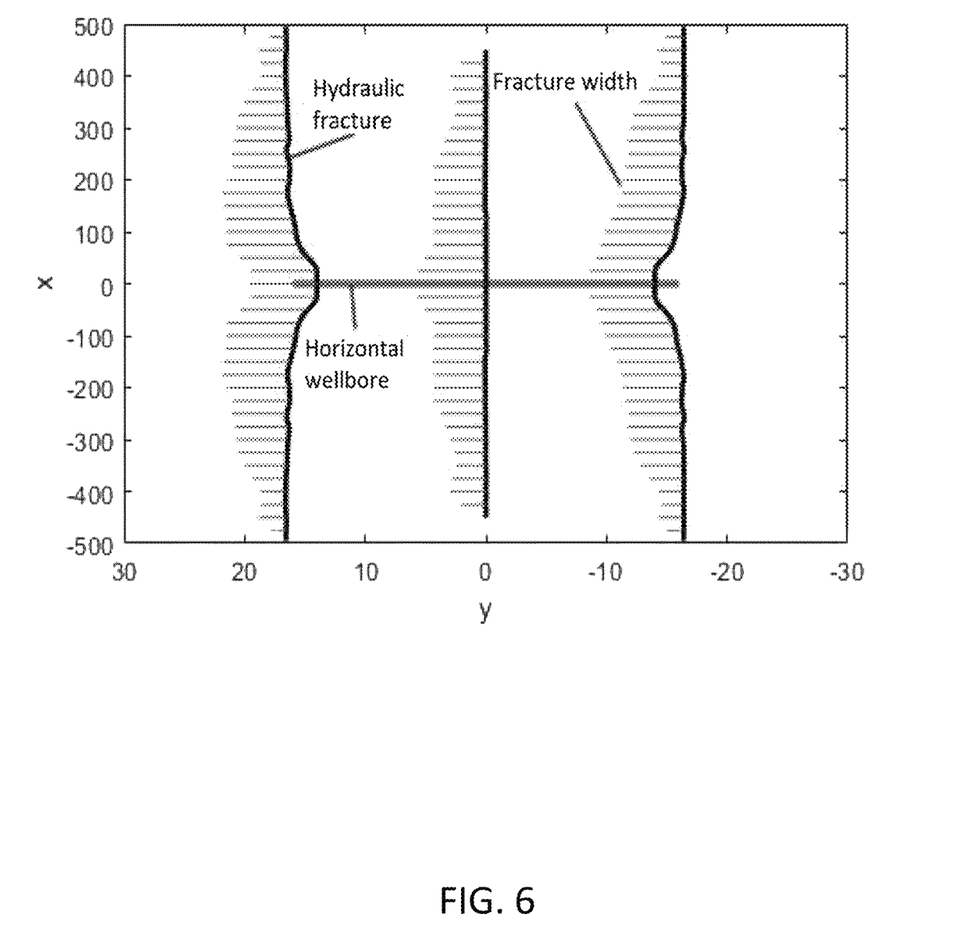
FIG. 6 is a diagram showing the fracture growth results of the simulation of the 3rd fracturing stage of the tight oil well CP using the optimized perforation parameters according to another embodiment of the present invention, wherein the fracture width is 800 times enlarged.

As shown in FIG. 6, taking the 3rd fracturing stage of the tight oil well CP in the Northeastern region as an example, the 3rd fracturing stage has three clusters of perforations. A method for optimizing perforation parameters to maintain the uniform fracture growth in multi-stage hydraulic fracturing of horizontal well includes the following steps:

S1: Collecting and arranging the geological and engineering parameters of the 3rd fracturing stage of the tight oil well CP, shown in Table 4:

TABLE 4

Example - Geological and engineering parameter table for 3rd fracturing stage of the tight oil well CP

| Young's modulus E, MPa | 3800 | Pumping time $t_s$, s | 3000 |
|---|---|---|---|
| Maximum horizontal minimum principal stress $\sigma_{max}$, MPa | 35 | Minimum horizontal maximum principal stress $\sigma_{min}$, MPa | 35 |
| Poisson's ratio ν | 0.22 | Cluster spacing d, m | 17 |
| Fracturing fluid viscosity μ, MPa·s | 1 × 10$^{-8}$ | Reservoir thickness h, m | 20 |
| Fracturing fluid total pumping flow Q, m$^3$/s | 0.133 | Fracturing fluid density ρ, kg/m$^3$ | 1000 |
| Sleeve outer diameter, mm | 127 | Sleeve inner diameter, mm | 108 |

The net inlet pressure of fractures within the fracturing stage of horizontal well is calculated based on formula (1): $p_i$=6.04 MPa.

S2: According to the well logging data, calculating the minimum principal stress difference $\sigma_d$ in the fracturing stage based on the formula (2) as 0 MPa, and calculating the attenuation coefficient G based on the formula (4) as 0.3596. Then, calculating the equivalent value of stress shadowing S as 2.172 MPa based on the formula (3). Finally, taking the constant coefficient λ to be 1, and calculating the required perforation friction coefficient $\alpha_f$ based on the formula (5) as 1105.1 MPa·s²/m⁶.

S3: Taking K to be 0.6 to consider the perforation erosion effect. Based on the calculated perforation friction coefficient $\alpha_f$ and the formula (6), calculating the perforation characteristic parameter F as $1.43 \times 10^{-3}$ m². S4: The designed length of perforation interval $l_p$ is 1 m in the 3rd fracturing stage of the tight oil well CP. According to the perforation characteristic parameter $F=1.26 \times 10^{-3}$ m² and the list index of perforation parameters (Table 2), selecting several of candidates of perforating guns that satisfy formula (7) as follows: According to the perforation characteristic parameter $F=1.26 \times 10^{-3}$ m² and the list index of perforation parameters (Table 2), selecting several of candidates of perforating guns that satisfy formula (7) as Nos. 1-5, 7 and 10. The values of $n_p d_p^2$ corresponding to the above perforating guns are $8.29 \times 10^{-4}$ m², $6.22 \times 10^{-4}$ m², $1.16 \times 10^{-3}$ m², $1.01 \times 10^{-3}$ m², $1.24 \times 10^{-3}$ m², $1.3 \times 10^{-3}$ m² and $1.24 \times 10^{-3}$ m², respectively, which are smaller than the perforation characteristic parameter $F=1.43 \times 10^{-3}$ m², thereby satisfying the requirement. As the value of $n_p d_p^2$ of the candidate No. 7 is closer to the F and its size is suitable for the sleeve, the optimized perforating gun and corresponding perforation parameters are then determined as follows: the seventh candidate with outer diameter of 89 mm is chosen, the optimized perforation density $d_d$ is 13 holes per meter, and the optimized perforation hole diameter $d_p$ is 10 mm S5: Establishing a fully coupled numerical model for hydraulic fracture growth shown in FIG. 3, according to the geological and engineering parameters for the 3rd fracturing stage of the tight oil well CP. Then, solving the simulation according to the calculation flow of the numerical model shown in FIG. 2. Among which, the perforation parameters are set as the optimized values that perforation density $d_d$=13 m⁻¹ and perforation diameter $d_p$=10 mm. The predicted fracture growth results for the pumping time of 3000 s are shown in FIG. 6.

S6: For the simulation results shown in FIG. 6, calculating the variation coefficient C of the fracture lengths as 0.0539 based on the formula (12). The value of C is less than 0.25, indicating the optimized perforation parameters can effectively maintain the uniform growth of hydraulic fractures. After performing actual fracturing treatment in the 3rd fracturing stage of the tight oil well CP with the optimized perforation parameters, micro-seismic data are collected for estimating the lengths of hydraulic fracture. The variation of coefficient for fracture lengths is estimated by micro-seismic data as 0.068. Therefore, the design optimization for perforation parameters is effective and the limited-entry method is considered to be successful in this treatment.

Figure 7:
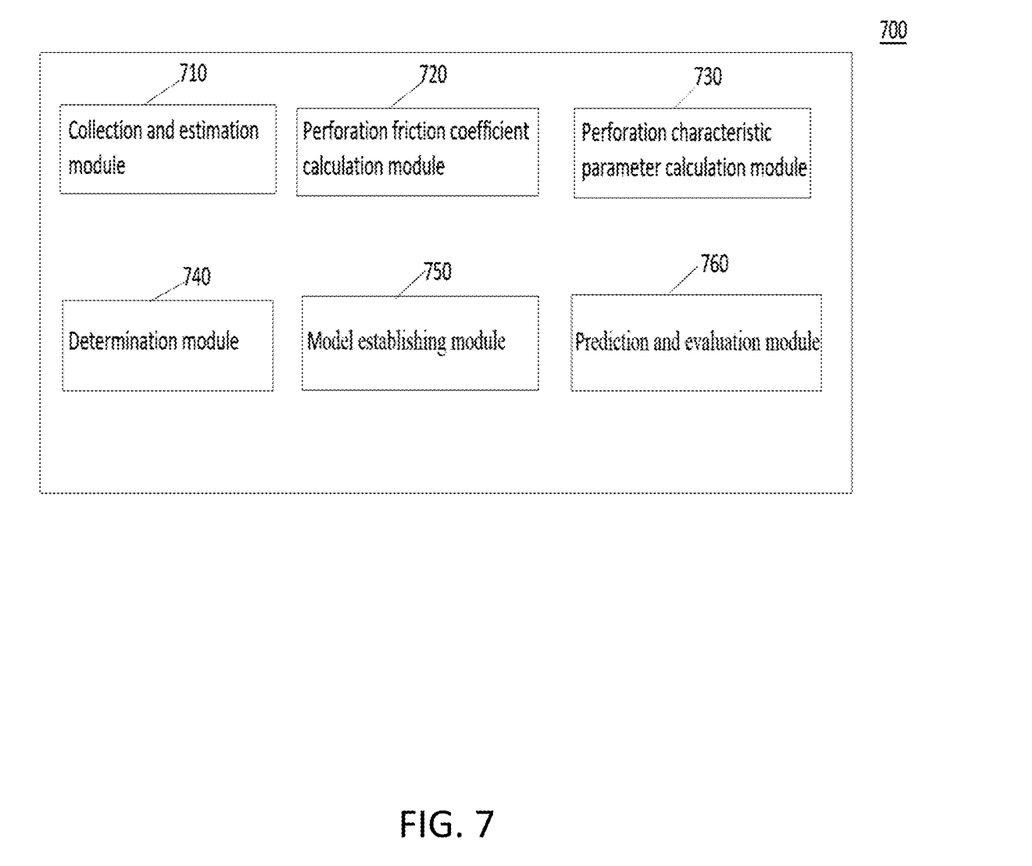
FIG. 7 is a block diagram of a device for optimizing perforation parameters to maintain uniform fracture growth in multi-stage hydraulic fracturing of horizontal well according to an embodiment of the present invention.

Please refer to FIG. 7. FIG. 7 is a block diagram of a device 700 for optimizing perforation parameters to maintain uniform fracture growth in multi-stage hydraulic fracturing of horizontal well according to an embodiment of the present invention. As shown in FIG. 7, the device 700 includes a collection and estimation module 710, a perforation friction coefficient calculation module 720, a perforation characteristic parameter calculation module 730, a determination module 740, a model establishing module 750, and a prediction and evaluation module 760. The collection and estimation module 710 is configured to collect geological and engineering parameters of a target pay zone, and estimate the net inlet pressure of fractures within the targeted fracturing stage of horizontal well. The perforation friction coefficient calculation module 720 is configured to calculate the perforation friction coefficient required for maintaining uniform fracture growth in multi-stage hydraulic fracturing of horizontal well. The perforation characteristic parameter calculation module 730 is configured to calculate the perforation characteristic parameter. The determination module 740 is configured to determine the optimized perforation parameters. The model establishing module 750 is configured to establish a fully coupled numerical model for hydraulic fracture growth. The prediction and evaluation module 760 is configured to predict and evaluate the uniformity of fracture growth extents in multi-stage hydraulic fracturing using the optimized perforation parameters.

By adopting the method for optimizing perforation parameters to maintain uniform fracture growth in multi-stage hydraulic fracturing of horizontal well and device thereof of the present invention, the stimulated zone of production wells and the permeability of gas (oil) reservoir can be enlarged, leading to an improvement of gas (oil) productions and a reduction of production costs. Therefore, the invention can promote the commercial development of gas (oil) reservoir.

The foregoing outlines features of several embodiments so that those skilled in the art may better understand the aspects of the present invention. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions, and alterations herein without departing from the spirit and scope of the present invention.

What is claimed is:

1. A method for optimizing perforation parameters to maintain uniform fracture growth in multi-stage hydraulic fracturing of horizontal well, comprising:
   collecting geological and engineering parameters of a targeted pay zone, and estimating a net inlet pressure of fractures within a targeted fracturing stage of horizontal well;
   calculating a perforation friction coefficient required for maintaining uniform fracture growth in multi-stage hydraulic fracturing of horizontal, wherein the calculating the perforation friction coefficient step further comprises the following sub-steps:
   S21: calculating a minimum horizontal principal stress difference in the fracturing stage:

$$\sigma_d = \sigma_{max} - \sigma_{min} \qquad (2);$$

wherein:
   $\sigma_d$ is the minimum horizontal principal stress difference in the fracturing stage, MPa;
   $\sigma_{max}$ is the maximum value among the minimum horizontal principal stresses at every perforation clusters in the fracturing stage, MPa;

$\sigma_{min}$ is the minimum value among the minimum horizontal principal stresses at every perforation clusters in the fracturing stage, MPa;

S22: calculating an equivalent value of stress shadowing:

$$S = Gp_i + \sigma_d \quad (3);$$

$$G = 1 - \frac{d^3}{[d^2 + (h/2)^2]^{3/2}}; \quad (4)$$

wherein:
S is the equivalent value of stress shadowing, MPa;
G is an attenuation coefficient related to the distance, no factor;
$p_i$ is the net inlet pressure of fractures within the fracturing stage, MPa;
d is a spacing between the perforation clusters, m;
h is a thickness of the reservoir rock, m;

S23: calculating a perforation friction coefficient required for maintaining uniform fracture growth in fracturing stage:

$$\alpha_f = \frac{\lambda S}{(Q/N)^2}; \quad (5)$$

wherein:
$\alpha_f$ is a required perforation friction coefficient, MPa·s²/m⁶;
$\lambda$ is a constant coefficient, no factor;
Q is a total pumping flow rate of fracturing fluid, m³/s;
N is a number of perforation clusters in the fracturing stage, no factor calculating a perforation characteristic parameter according to formula (6):

$$F = \left(\frac{8 \times 10^{-6} \rho}{\pi^2 K^2 \alpha_f}\right)^{0.5}; \quad (6)$$

wherein:
F is the perforation characteristic parameter, m²;
$\rho$ is a density of the fracturing fluid, kg/m³;
K is a discharge coefficient, no factor;
$\alpha_f$ is the required perforation friction coefficient, MPa·s²/m⁶ determining optimized perforation parameters by selecting candidates of perforating guns are selected according to the perforation characteristic parameter F calculated, with reference to a list index of perforation parameter for the commonly-used perforating guns, and an optimized perforating gun is further chose, and an optimized perforation density $d_d$ and an optimized perforation diameter $d_p$ are determined; the candidates of perforating gun satisfying:

$$n_p d_p^2 \leq F \quad (7);$$

$$n_p = l_p d_d \quad (8),$$

wherein:
$n_p$ is the number of perforations in the perforation cluster, no factor;
$d_p$ is the perforation diameter, m;
F is the perforation characteristic parameter, m²;
$L_p$ is the designed length of perforation interval, m;
$d_d$ is the perforation density of the perforation clusters, 1/m;
and
selecting and optimizing an optimized perforating gun, and eliminating out-of-control small portions of hydraulic fracturing propagations causing inter-well interference.

2. The method for optimizing perforation parameters to maintain uniform fracture growth in multi-stage hydraulic fracturing of horizontal well in claim 1, wherein the net inlet pressure of fractures within the targeted fracturing stage of horizontal well is calculated according to formula (1):

$$p_i = 1.28 \times \left[\frac{E^4(Q/N)^2 \mu}{(1-v^2)^4 h^6}\right]^{0.2} t^{0.2}; \quad (1)$$

wherein:
$p_i$ is the net inlet pressure of fractures within the fracturing stage, MPa;
E is a Young's modulus of the reservoir rock, MPa;
Q is a total pumping flow rate of fracturing fluid, m³/s;
N is a number of perforation clusters in the fracturing stage, no factor;
$\mu$ is a viscosity of the fracturing fluid, MPa·s;
$v$ is a Poisson's ratio of the reservoir rock, no factor;
h is a thickness of the reservoir rock, m;
t is a pumping time, s.

3. The method for optimizing perforation parameters to maintain uniform fracture growth in multi-stage hydraulic fracturing of horizontal well in claim 1, wherein the constant coefficient $\lambda = 1 + 0.2x$, x is a number of repeats of calculating the perforation friction coefficient step, and x is initially set as 0.

4. The method for optimizing perforation parameters to maintain uniform fracture growth in multi-stage hydraulic fracturing of horizontal well in claim 1, wherein the discharge coefficient K=0.6.

5. The method for optimizing perforation parameters to maintain uniform fracture growth in multi-stage hydraulic fracturing of horizontal well in claim 1, further comprises:
establishing a fully coupled numerical model for hydraulic fracture growth; and
predicting and evaluating an uniformity of fracture growth extents in multi-stage hydraulic fracturing using the optimized perforation parameters.

6. The method for optimizing perforation parameters to maintain uniform fracture growth in multi-stage hydraulic fracturing of horizontal well in claim 5, wherein the establishing the fully coupled numerical model for hydraulic fracture growth step further comprises the following sub-steps:

S51: dividing the fracturing time into multiple time steps, calculating a fluid-solid coupling equation in each time step to obtain a fracture width w and a net fracture fluid pressure p:

$$w = \Delta t[B(w,d)p] + \Delta t(Q_{V,r}/h)\delta + w_{t-1} \quad (9);$$

wherein:
w is a fracture width, m;
$\Delta t$ is a time step, s;
B(w, d) is the fluid-solid coupling coefficient matrix, m·MPa⁻¹;

d is a spacing between the perforation clusters, m;
p is the net fluid pressure, MPa;
$Q_{V,n}$ is the pumping flow rate of n-th fracture, m³/s;
h is the thickness of the reservoir rock, m;
δ is the Dirac δ function, representing the pump source, m⁻¹;
$w_{t-1}$ is the fracture width at the previous time step, m;
boundary conditions required to calculate formula (9) are:

$$\begin{cases} p_o^1 + p_p^1 = p_o^2 + p_p^2 = \ldots = p_o^N + p_p^N \\ Q = \sum_{n=1}^{N} Q_{V,n} \\ p_p^n = \frac{8 \times 10^{-6} \rho Q_{V,n}^2}{\pi^2 n_p^2 d_p^4 K^2} \end{cases} ; \quad (10)$$

wherein:
$p_o$ is the fluid pressure at inlet of the n-th fracture, MPa;
$p_p$ is the perforation frictional pressure drop of the n-th fracture, MPa;
Q is the total pumping flow rate of fracturing fluid, m³/s;
p is the density of the fracturing fluid, kg/m³;
$n_p$ is the number of perforation in the perforation cluster, no factor;
$d_p$ is the perforation diameter, m;
K is the discharge coefficient, no factor;
S52: after obtaining the fracture width w and the net fluid pressure p, calculating a growth direction of the hydraulic fracture in the time step;

$$\tan(\theta/2) = -\frac{2\tau}{1 + \sqrt{1 + 8\tau^2}}; \quad (11)$$

wherein:
θ is the deflection angle of the fracture growth path, no factor;
τ is the ratio of the type II stress intensity factor of the hydraulic fracture to the type I stress intensity factor of the hydraulic fracture, no factor;
the fully coupled numerical model for hydraulic fracture growth is composed of the formulas (9), (10) and (11).
7. The method for optimizing perforation parameters to maintain uniform fracture growth in multi-stage hydraulic fracturing of horizontal well in claim 5, wherein the predicting and evaluating of the uniformity of fracture growth extents step further comprises the following sub-steps:

S61: substituting the geological and engineering parameters of the target pay zone into the fully coupled numerical model established in the establishing the fully coupled numerical model for hydraulic fracture growth step, selecting the optimized perforation parameters that are the perforation density $d_d$ and the perforation diameter $d_p$ for simulation calculation, and predicting the fracture growth results in multi-stage hydraulic fracturing;

S62: calculating the coefficient of variation for the lengths of all fractures in the fracturing stage after multi-stage hydraulic fracturing, according to the simulation results:

$$C = \frac{\sigma_l}{\left(\sum_n^N l_n\right)/N}; \quad (12)$$

wherein:
C is the coefficient of variation for the lengths of all fractures in the fracturing stage, no factor;
$\sigma_l$ is the standard deviation for the lengths of all fractures in the fracturing stage, m;
$l_n$ is the fracture length of n-th fracture, m;
N is the number of perforation clusters in the fracturing stage, no factor;

S63: determining whether the optimized perforation parameters can effectively maintain the uniform growth of hydraulic fractures according to the calculation results of the coefficient of variation C:
when C obtained by calculation is <0.25, it is considered that the optimized perforation parameters can effectively maintain the uniform growth of hydraulic fractures;
when C obtained by calculation is ≥0.25, it is considered that the optimized perforation parameters cannot effectively maintain the uniform growth of hydraulic fractures, then repeating steps to further optimize the perforation parameters.

* * * * *